United States Patent [19]

Silvestri, Jr.

[11] 4,336,105
[45] Jun. 22, 1982

[54] NUCLEAR POWER PLANT STEAM SYSTEM

[75] Inventor: George J. Silvestri, Jr., Upper Chichester, Pa.

[73] Assignee: Westinghouse Electric Corp., Pittsburgh, Pa.

[21] Appl. No.: 100,677

[22] Filed: Dec. 5, 1979

[51] Int. Cl.³ .............................................. G21C 7/00
[52] U.S. Cl. .................................... 60/644.1; 376/317
[58] Field of Search ............................ 176/20, 22, 65

[56] References Cited

U.S. PATENT DOCUMENTS

| 3,575,807 | 4/1971 | Ripley | 176/20 R |
|---|---|---|---|
| 4,000,037 | 12/1976 | Nusbaum et al. | 176/20 R |
| 4,050,418 | 9/1977 | Watanabe | 176/20 R |
| 4,061,533 | 12/1977 | Durrant | 176/22 |
| 4,104,117 | 8/1978 | Parziale et al. | 176/20 R |

FOREIGN PATENT DOCUMENTS

| 51-2898 | 1/1976 | Japan | 176/20 R |
|---|---|---|---|
| 51-10294 | 1/1976 | Japan | 176/20 R |
| 51-12794 | 4/1976 | Japan | 176/20 R |

Primary Examiner—Sal Cangialosa
Attorney, Agent, or Firm—W. E. Zitelli

[57] ABSTRACT

Apparatus utilizing steam from first, second and third extraction points of a steam turbine in a nuclear power plant steam system as heating steam in at least two feedwater heater units for maintaining the final feedwater temperature above a predetermined temperature value is disclosed. More specifically, when the plant loading is determined above a predetermined first level, the apparatus provides heating steam from the first extraction point to a final feedwater heater unit in the feedwater return path of the steam system and also provides heating steam, which is at a lower pressure than that from the first extraction point, from the second extraction point to another feedwater heater unit which preheats the feedwater prior to entering the final feedwater heater unit. At times, when the plant loading falls below the first level, heating steam, which is at a higher pressure than that of the first extraction point, is provided to the final feedwater unit from the third extraction point and a portion of the steam from the first extraction point is redirected as heating steam for the another feedwater heater unit. Moreover, at times, when the plant loading falls below a second predetermined level, which is lower than the first level, the heating steam from the third extraction point provided to the final feedwater heater unit is increased in pressure preferably by an ejector or jet pump device utilizing motive steam from a high pressure source, and in addition, a portion of the steam from the third extraction point is redirected to the another feedwater heater unit.

13 Claims, 4 Drawing Figures ically shown in FIG. 1. More particulary, the nuclear
NUCLEAR POWER PLANT STEAM SYSTEM

BACKGROUND OF THE INVENTION

The invention relates to nuclear power plant steam systems in general, and more particularly to apparatus for and a method of maintaining the final feedwater temperature of the power plant steam system at least at a minimum temperature especially under partial plant loading conditions.

Typically, the steam system arrangement of a light water or liquid metal nuclear power plant is as illustratively shown in FIG. 1. More particulary, the nuclear coolant is heated in a nuclear reactor type boiler 10 and cycled through at least one steam generator 12 via conventional supply and return piping, 14 and 16, respectively. Each steam generator 12 may include an evaporator section 18 and a superheater section 20 wherein heat is transferred from the coolant to preheated feedwater which is fed therethrough from piping 22. The heat exchange process of the at least one steam generator 12 converts the feedwater to steam which is exited at a main steam throttle header 24 and passed to a high pressure (HP) section 26 of a steam turbine over piping 28. An arrangement of steam admission valves denoted at 30 regulates the passage of steam to the HP section 26. Steam is exhausted from the HP section 26 through crossunder piping 32 and thereafter reheated in a conventional moisture separator reheater (MSR) 34 utilizing a steam-to-steam heat exchanging process. Heating steam may be provided to high and low pressure reheating sections 34A and 34B of the reheater 34 from respective extraction points 35 and 36 of the HP section 26. Non-return and shut-off type valves denoted at 37 may be disposed in the heating steam path from the extraction points 35 and 36. Reheated steam from reheater 34 may then be expanded through one or more low pressure (LP) turbine sections denoted at 38 and exited therefrom into a condenser 39 wherein the expanded steam is converted back to its liquid state and recycled as feedwater back to the at least one steam generator 12.

Generally, in the feedwater return path to the at least one steam generator 12, the feedwater is preheated in a number of feedwater heaters units denoted by the blocks at 40, 42, and 44 which are representative of any number of conventional parallel and cascaded string arrangements of feedwater heaters. In addition, the flow of the cycled feedwater in the return path may be regulated by a conventional feed pump denoted at 46. In most nuclear plants, heating steam is provided to the feedwater heater units 40, 42, and 44 for the heat exchange process from steam extraction points located at the HP and LP turbine sections 26 and 38, respectively. For example, low pressure steam may be supplied to the low pressure feedwater heater unit 40 from at least one extraction point 50 in the LP turbine section 38. A nonreturn and/or shut-off valve denoted at 52 may be disposed in the steam extraction path 50 to primarily prevent any water formation from entering the LP section 38.

Similarly, heating steam may be provided to the higher pressure heater units 42 and 44 from the extraction points located at the HP section 26. In at least one known nuclear facility, heating steam is provided to the heater 42 from an extraction point 54 disposed in the vicinity of the exhaust end of section 26. In addition, the primary heating steam of the highest pressure heater unit 44 may be supplied from the extraction point 36 disposed at a location in the HP section 26 which has a greater steam pressure than extraction point 54. Supplementary heating steam may be provided to the heater unit 44 from the heating steam return lines 56 and 58 of the low and high pressure reheater sections 34B and 34A, respectively. In some cases, flash tanks 60 and 62 are disposed in the respective return lines 56 and 58 to convert the returned fluid from the MSR 34 to steam and to regulate the pressure of the heating steam provided therefrom over lines 56 and 58 commensurate with that of the feedwater heater 44.

For the case in which liquid metal, such as sodium (Na), for example, is used as the nuclear reactor coolant, the feedwater exiting the final feedwater heating unit 44 enroute to the at least one steam generator 12 through piping 22 is desirably maintained above a predetermined temperature to keep the liquid metal coolant (Na) in a molten state for adequate circulation through the generator(s) 12. Insufficient preheating of the feedwater return to the at least one steam generator 12 may cause the liquid metal to partially solidify, thus affecting the circulation thereof and creating the possibility of deleterious heating conditions in the steam generator(s) 12.

The concerns of insufficient preheating of feedwater are not restricted to only liquid metal coolant nuclear plants, but also to certain types of light water nuclear reactor plants, especially ones which use oncethrough type steam generators. In these plants, the introduction of inadequately heated feedwater to the steam generator(s) 12 may cause erratic high heat flux densities creating the situation for certain instability problems peculiar to these type plants. It is additionally possible under this same situation to bring about heating conditions which may cause the dry out of fluid in some areas of the steam generator. During these unevenly distributed heating conditions, deposition of solids may occur in the dry out areas rendering inefficient heat transfer generation and the possibility of deleterious effects to the steam generator(s) 12. Thus, it is of paramount importance in nuclear plants, especially the types described hereabove, to maintain the temperature of the feedwater entering the steam generator(s) 12 above a safe predetermined minimum level.

It is well known thermodynamically that as the load on the steam turbine is reduced, the steam pressure at the extraction points will also be reduced approximately in direct proportion therewith. An example of this phenomenon for a typical liquid metal nuclear reactor power plant is illustratively depicted in the graph of FIG. 2 in which the lines 70, 72 and 74 correspond respectively to the steam pressures at the extraction points 35, 36 and 54 with respect to the load of the plant. It is also well known that the temperature which the extracted heating steam may ultimately attain is limited by the saturation pressure thereof. For example, if the extracted steam is at atmospheric pressure, the temperature approaches only 212° F. (100° C.) at a maximum. So in order to maintain the final feedwater temperature above a predetermined minimum value, the extraction steam for at least one feedwater heat unit, like 44, for example, should be kept above a minimum steam pressure value to provide the necessary heat energy for the heat exchanging process occurring therein.

For the case of the liquid metal coolant, as one example, the extraction steam pressure to heater 44 for one proposed plant should be kept above approximately 360 psi in order to maintain the final feedwater temperature above 350° F. With this in mind, it is readily apparent from the characterizations exemplified in FIG. 2, that at lower plant loading conditions, a supplementary higher pressure source of heating steam, other than the normal extraction sources, may be necessary at some point in the load reduction to maintain the final feedwater temperature above its predetermined minimum level. Some present nuclear steam supply cycles, like the one shown in FIG. 1, for example, supply this high pressure supplementary heating steam from the main steam throttle header 24. Other nuclear steam supply cycles may utilize high pressure steam from an auxiliary boiler (not shown in FIG. 1) which may be operated with fossil fuel. In either case, the supplementary steam source for feedwater heating is generally at superheated temperatures and pressures, which may be sometimes as high as 850° F., and 2200 psig, for example. For this reason, present nuclear steam supply cycles include a desuperheater and pressure regulating station like those illustratively shown respectively at 78 and 80, 82 in the steam cycle arrangement of FIG. 1.

Supplementary heating steam sources of the type described hereabove usually have inherent disadvantages in thermodynamically matching the heating steam between the supplemental source and the heater unit 44 at partial loading conditions. Using throttle steam like that shown at 24 for supplemental feedwater heating steam at low loading conditions actually increases the power plant heat rate significantly. This is due primarily to the high thermodynamic losses effectuated by the desuperheater 78 and pressure reducing stations 80 and 82. Exemplary calculations which were conducted for a proposed liquid metal fast breeder reactor, LMFBR, plant indicated that at 23% load, the heat rate may increase by 2.1%; at 12% load, the heat rate may increase by 4.7; and for 5% load, the increase in heat rate may rise to 10.1%. Ostensibly, from these exemplary calculations, the present way of supplementing heating steam to the feedwater heaters to maintain the final feedwater temperature above a predetermined minimum level appears inefficient with respect to the heat rate of the overall nuclear plant. The above calculated figures additionally reflect an added plant operating expense in generating the BTU's for the increase in heat rate, much of which are wasted in the temperature and pressure reductions for the thermodynamic matching process. The cost of supplying the additional BTU's may even be greater in the case in which an auxiliary boiler using fossil fuel is used as a supplementary steam source.

From the foregoing, it is apparent that another way to supply supplemental steam to the feedwater heater units for maintaining the final feedwater temperature above a predetermined minimum level, a way which reduces energy generation expense and energy waste, is most desirable, especially at the present time when energy production costs and conservation are of paramount consideration.

SUMMARY OF THE INVENTION

A nuclear power plant steam system includes at least one steam generator for generating steam, a steam turbine for conducting the generated steam therethrough and having at least a first and second steam extraction points for extracting steam therefrom, a condenser for condensing exhausted steam from the steam turbine, a return path for returning the condensed steam as feedwater to the at least one steam generator, and at least one feedwater heater unit disposed in the return path for preheating the feedwater conducted therethrough to a final feedwater temperature prior to entering the at least one steam generator. The steam pressure of the first and second extraction points vary as a function of the plant loading conditions with the pressure of the first point being greater than the second. In accordance with the present invention, apparatus is provided in the nuclear power plant steam system for maintaining the final feedwater temperature above a predetermined temperature value.

More specifically, the apparatus comprises a first means for providing, upon activation, steam from the first extraction point to the at least one feedwater heater unit as heating steam to preheat the feedwater conducted therethrough, second means for providing steam from the second extraction point to the at least one feedwater heater unit a heating steam to preheat the feedwater conducted therethrough, means for monitoring steam system parameters representative of the power plant loading conditions, and controlling means, governed by the monitoring means, to activate the first means to provide heating steam to the at least one feedwater heater unit from the first extraction point.

In addition, the nuclear power plant steam system includes a third extraction point for extracting steam from the steam turbine at a lower pressure than that of the second extraction point, and another feedwater heater unit disposed in the feedwater return path for preheating the feedwater prior to entering the one feedwater heater unit. The steam pressure at the third extraction point also varies as a function of the plant loading conditions. The temperature maintaining apparatus further includes a third means for providing steam from the third extraction point to the another feedwater heater unit as heating steam to preheat the feedwater conducted therethrough, fourth means for providing, upon activation, steam from the second extraction point to the another feedwater heater unit as heating steam to preheat the feedwater conducted therethrough, and second controlling means, governed by the monitoring means, to activate the fourth means to provide heating steam to the another feedwater heater unit from the second extraction point. Preferably, the first and second controlling means activate the first and fourth means, at times, when the monitored steam system parameters reflect power plant loading conditions which are below a first predetermined power plant loading condition.

In another aspect of the present invention, the temperature maintaining apparatus additionally includes means for regulating thermodynamically, upon activation, the heating steam from the first extraction point to be compatible with that of the heating steam in the one feedwater heater unit. Preferably, the regulating means is a jet pump utilizing motive steam from a steam source at a pressure substantially higher than that of the steam extracted from the first point. The jet pump is activated by the controlling means, at times, when the monitored steam system parameters reflect power plant loading conditions which are below a second predetermined power plant loading condition to regulate the pressure of the steam extracted from the first point prior to being conducted as heating steam to the one feedwater heater unit.

DESCRIPTION OF PREFERRED EMBODIMENT

Figure 1:
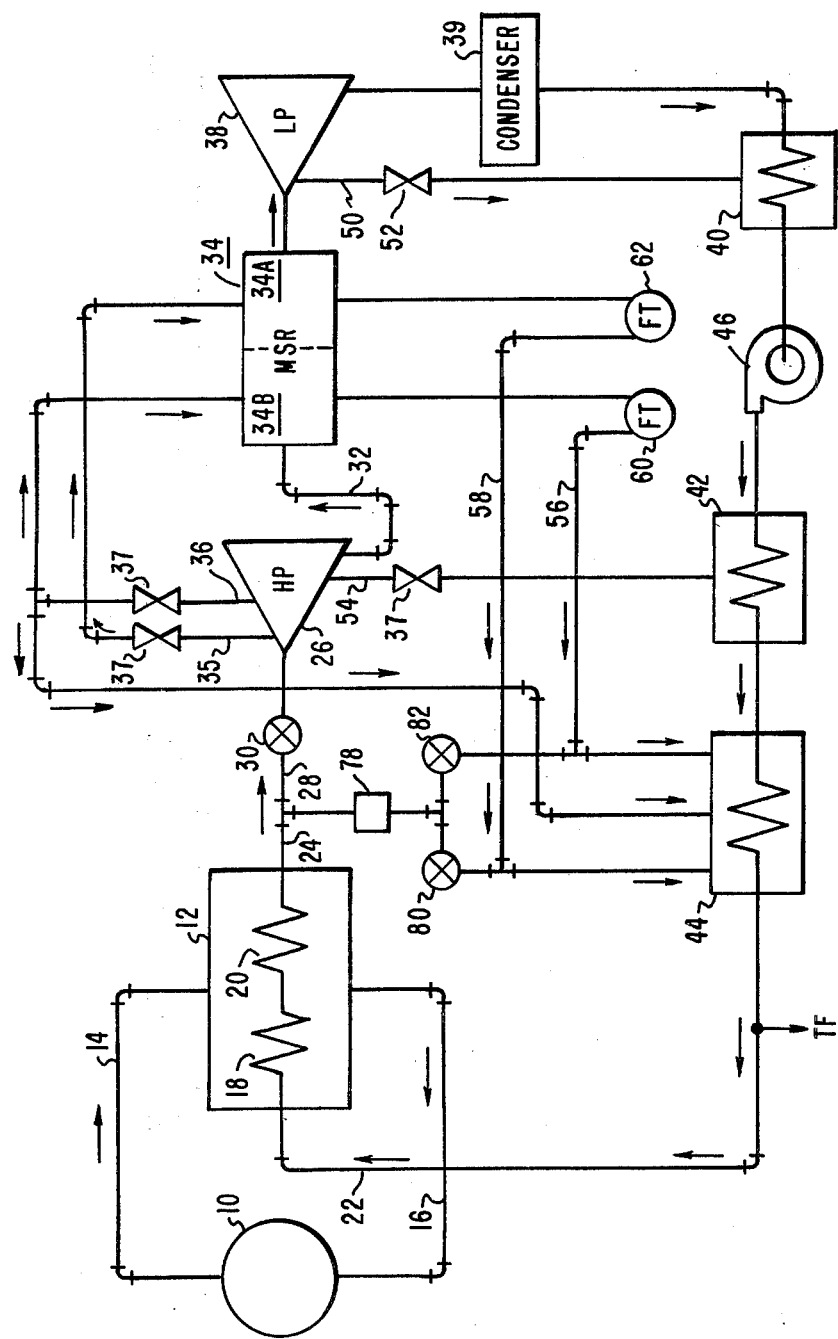
FIG. 1 is a block diagram schematic of a power plant steam system environment suitable for embodying the principles of the present invention.
Figure 3:
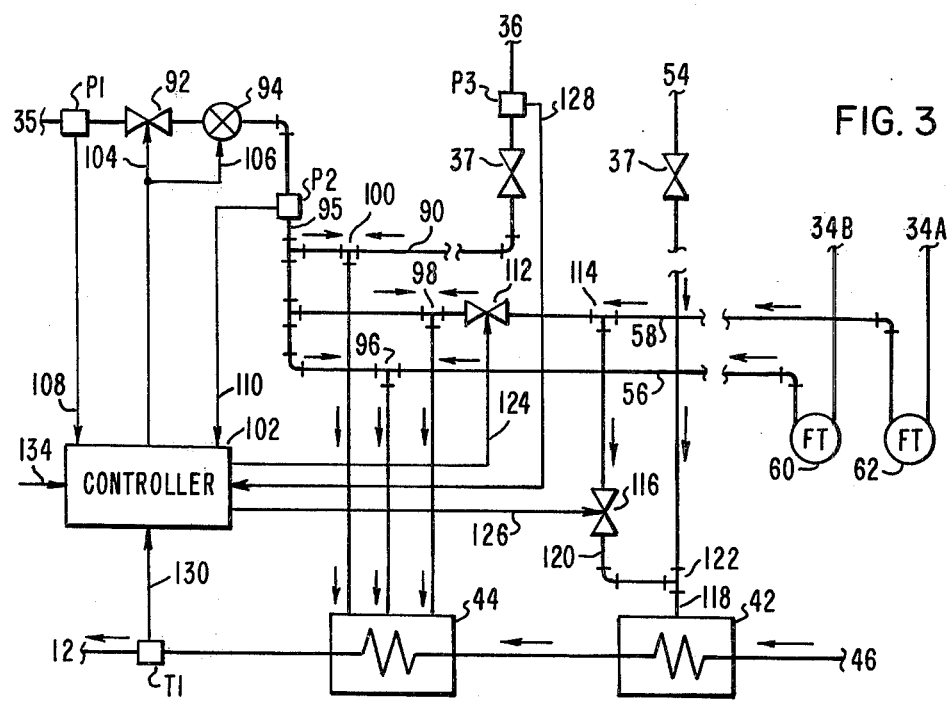
FIG. 3 is a schematic block diagram of an embodiment of one aspect of the present invention.

The present invention is suitably embodied in the nuclear power plant steam supply system similar to the one illustratively shown in FIG. 1. For purposes of description, the present invention is described in connection with FIGS. 3 and 4 which depict modifications to the plant steam system of FIG. 1. Referring to FIG. 3, heating steam exiting the low pressure reheater section 34B may be supplied to a flash tank 60 and thereafter provided to the feedwater heater unit 44 over conventional piping 56. Likewise, heating steam from the high pressure reheater section 34A is passed through flash tank 62 and thereafter provided to the feedwater heater unit 44 utilizing conventional piping 58. In addition, steam may also be provided to the feedwater heater unit 44 from the extraction point 36 located at the high pressure turbine 26 over conventional piping 90. Steam from the extraction point 35 located at the high pressure turbine 26 may be provided to a shut-off valve 92 which is normally positioned closed. Downstream of the valve 92, steam piping 95 is coupled to a regulating means 94 and thereafter, connected into the steam lines 56, 58 and 90 utilizing conventional coupling apparatus such as that exhibited at 96, 98 and 100, respectively. Governing the activation of the shut-off valve 92 and regulating means 94 is a conventional controller 102 using signal lines 104 and 106. Pressure transducers P1 and P2 may be positioned, respectively, upstream and downstream of the regulating means 94 to measure the steam pressure thereacross. The steam system pressure parameters at P1 and P2 may be monitored by the controller 102 utilizing signal lines 108 and 110, respectively. The controller 102 may be typically comprised of logical comparators for comparing monitored parameters such as steam pressures and the like, to predetermined limits for opening and closing valves, for example. Moreover, the controller 102 may include set point controllers, like proportional and proportional-plus-integral types which are governed by input errors between predetermined set points and feedback monitored parameters to control steam regulation, for example, the details of which being well known to all those skilled in the pertinent art.

Disposed in the steam path 58 between the coupling 98 and flash tank 62 is a normally-open (NO) type shut-off valve 112. In addition, in the path 58 between the valve 112 and flash tank 62 is another coupling connection 114 which provides redirection of the steam from path 58 to a normally open shut-off valve 116. Heating steam may be is provided to the feedwater heater unit 42 from the extraction point 54, which may also be located at the high pressure turbine 26, for example, over steam line 118. Steam line 120 and a coupling mechanism 122 permit an interconnection between the steam line 118 and the valve 116. The valves 112 and 116 may be actuated by signal lines 124 and 126, respectively, as governed by the controller 102.

A pressure transducer P3 may also be disposed at the extraction point 36 to monitor the steam pressure thereat. A signal 128 representative of the monitored steam pressure may also be provided to the controller 102. Furthermore, a temperature transducer T1 may be disposed in the path of the feedwater exiting the final feedwater heater unit 44 for monitoring the final feedwater temperature $T_F$. A signal 130 representative of the final feedwater temperature may be provided to the controller 102.

Figure 2:
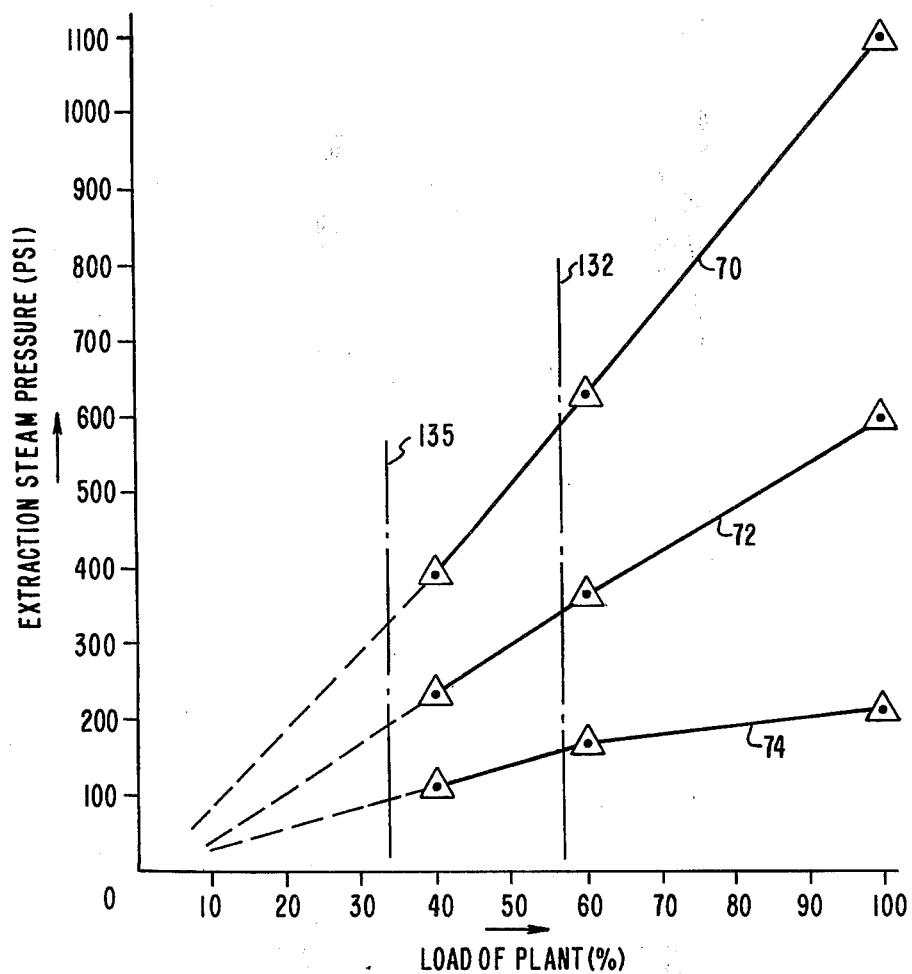
FIG. 2 is a graph illustrating the characteristics of turbine extraction steam pressure with variations in power plant loading conditions.

In a typical operation, assuming that the plant loading conditions are above 60% of plant rating and using the exemplary graphs depicted in FIG. 2, for example, the valves 37 and 112 may be activated open permitting steam to flow therethrough. The valves 92 and 116 may be actuated closed by the controller 102 inhibiting steam from flowing therethrough. Thus, heating steam may be provided to the feedwater heater unit 44 from the extraction point 36, and the heating steam exiting from the reheater sections 34A and 34B. Similarly, heating steam may be provided to the feedwater heater unit 42 from the extraction point 54. Now as the plant loading conditions are reduced below a first predetermined plant loading condition such as that depicted in FIG. 2 by the dashed line 132, the energy in the heating steam being provided to the feedwater heating units 42 and 44 may not be sufficient to maintain the temperature of the feedwater exiting the final heater unit 44 above a predetermined minimum temperature value. This may be detected by the controller 102 by comparing the pressure signal over line 128 with a predetermined first pressure setpoint value 134 which is supplied thereto. Should the plant loading conditions fall below the first predetermined value 132, for example, the controller 102 actuates valve 112 closed using signal lines 124 and actuates valves 92 and 116 open using signal lines 104 and 126, respectively. Thus, steam from the flash tank 62 is redirected from the feedwater heater 44 to the feedwater heater unit 42 through the valve 116, piping 120, coupling 122 and piping 118. It is noted that the pressure in the steam path 58 may be very close to the pressure of the steam extracted from point 54 at rated loading conditions. Once steam starts to pass through valve 92 from the extraction point 35, the controller 102 operates the regulating means 94 over signal line 106 to thermodynamically match the steam from the extraction point 35 to that of the heating steam already being provided to the feedwater heater unit 44. For these purposes, the controller monitors the pressures of P1 and P2 over the signal lines 108 and 110. Consequently, heating steam is being provided under these conditions to the feedwater heater units 42 and 44 at sufficient energy levels to maintain the final feedwater temperature above its predetermined minimum temperature level.

It is expected that under these conditions, there remains some loss in performance from using the higher pressure extraction steam in the final feedwater heater 44. However, the heat rate loss is only expected to be 6 to 41 BTU/KWH (2.1%) at about 25% load.

It is further noted from the exemplary graph of FIG. 2 that as the plant loading conditions are reduced further, the pressures of the heating steam being provided to the feedwater heater units 42 and 44 are reduced commensurately causing the temperatures to drop proportionately therewith. It can be anticipated then that at a reduced plant loading condition like that shown at 135 in FIG. 2, the heating steam may have insufficient energy to maintain the final feedwater temperature above its predetermined minimum temperature level. With respect to satisfying this condition, another aspect of the present invention is described in connection with the embodiment illustratively shown in FIG. 4.

Figure 4:
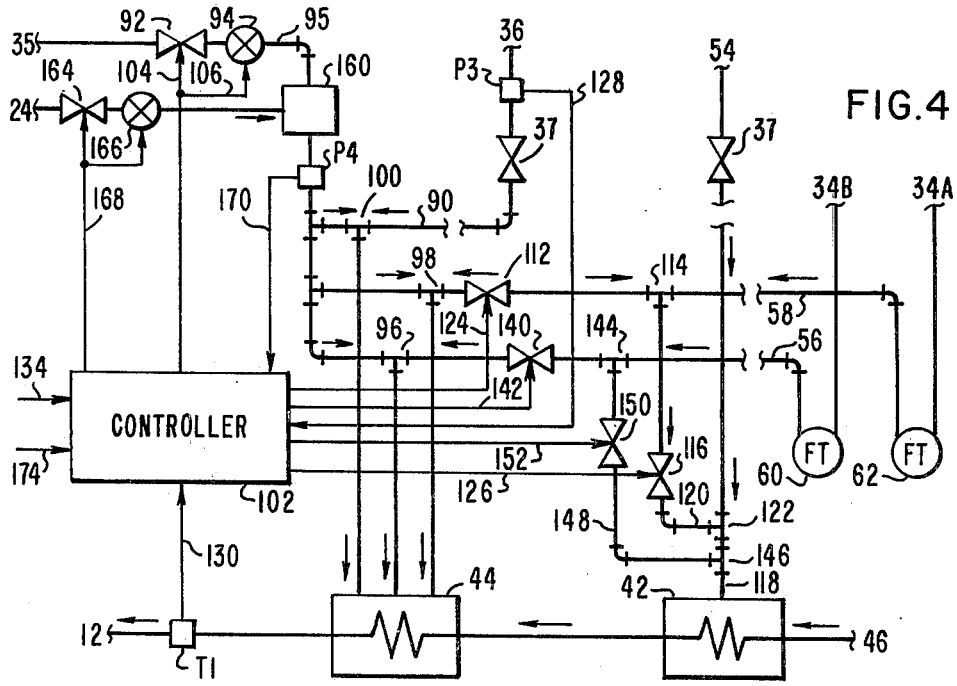
FIG. 4 is a schematic block diagram of an embodiment of another aspect of the present invention.

Referring to FIG. 4, disposed in the steam line 56 between the flash tank 60 and steam line coupler 96 may be a conventional normally open shut-off valve 140, the actuation of which is governed by the controller 102 using signal line 142. Coupling taps 144 and 146 are disposed in the steam line 56 between the valve 140 and flash tank 60 and in the steam line 118, respectively. Steam piping 148 connects the steam line couplers 144 and 146 for redirecting the steam from line 56 to line 118. Another conventional shut-off valve 150 is located in the steam line 148 to control the passage of steam therethrough. The valve 150 may be of the normally closed variety, the activation of which may be governed by the controller 102 using signal line 152.

Still further, a pressure increasing device 160, more commonly termed an ejector element or jet pump, for example, may be disposed in the steam line 95 which conducts steam from the turbine extraction point 35 to the feedwater heater unit 44. For a more detailed description of the pressure increasing device 160, reference is hereby made to the U.S. Pat. No. 3,973,402 entitled "Cycle Improvement For Nuclear Steam Power Plant" issued Aug. 10, 1976 and the U.S. Pat. No. 3,972,196 entitled "Steam Pressure Increasing Device For Drive Turbines" issued Aug. 3, 1976, both of the U.S. Patents being issued to the applicant of the present application. Normally, the jet pump 160 uses high pressure and high temperature steam as a motive fluid therein to increase the pressure of the steam flowing therethrough, such as the steam flowing in the steam line 95 to the feedwater heater unit 44, for example, so as to maintain a desired pressure level.

For the present embodiment, the motive steam is shown in FIG. 4 as being provided from the main steam throttle piping 24 over a conventional steam line 162, however, it is understood that this motive steam may come from another source, such as an auxiliary boiler, for example, without deviating from the principles of the present invention. Additionally disposed in the steam line 162 may be a shut-off valve 164 and a conventional regulating means 166. The shut-off valve 164 may control the flow of steam through the steam line 162 and the regulating means 166 may control the pressure and temperature of the steam being used as the motive fluid for the jet pump 160, for example. Both the shut-off valve 164 and regulating means 166 may be governed by the controller 102 using the signal lines 168. In the steam line 95 downstream of the jet pump 160 may be located another pressure transducer P4 for measuring the steam pressure as manipulated by the jet pump 160, for example. A signal representative of the measured pressure of P4 may be monitored by the controller 102 over signal line 170.

In a typical operation assuming the plant loading conditions are reduced below the first predetermined plant loading condition 132 and have subsequently reached the second predetermined plant loading condition 135 (see FIG. 2), the controller 102 may recognize this condition by monitoring the pressure signal 128, for example, which is a reflection of the plant loading conditions. When the pressure signal 128 falls below a predetermined setpoint 174 additionally supplied to the controller 102, the normally open shut-off valve 140 is activated closed and the shut-off valve 150 is activated open using signal lines 142 and 152, respectively. The steam flow through line 56 may be redirected then through steam lines 148 and 118 to the feedwater heater unit 42. Substantially concurrent therewith, the shut-off valve 164 may be activated open to allow steam to flow through the steam line 162 from the steam source at 24. Steam flowing through the line 162 to the jet pump 160 may be controlled by the regulating means 166 as governed by the controller 102 as a function of the pressure at P4 monitored by the controller 102 over signal line 170. Under these conditions, the pressure and thus temperature of the heating steam provided to the feedwater heater units 42 and 44 may be maintained sufficient to hold the final feedwater temperature at T1 above its minimum temperature value with a heat rate loss of only 33% as compared to 10.1% when using throttle steam above (see FIG. 1).

It is understood by all skilled in the pertinent art that the embodiments depicted in FIGS. 3 and 4 illustrate only one of many modifications to a nuclear plant steam system which may be used to embody applicant's invention. Therefore, applicant requests that his invention not be limited to any one embodiment, but be construed from the breadth and broad scope of the claims to follow.

I claim:

1. In a nuclear power plant steam system including a steam generating means for generating steam; a steam turbine for conducting said generated steam therethrough and having at least first and second steam extraction points for extracting steam therefrom, the steam pressures of said first and second extraction points varying as a function of the plant loading conditions with the steam pressure of said first extraction point being greater than that of said second; a condenser for condensing exhausted steam from said steam turbine; a return path for returning said condensed steam as feedwater to said steam generating means; and at least one feedwater heater unit disposed in said return path for preheating the feedwater conducted therethrough to a final feedwater temperature prior to entering said steam generating means, apparatus for maintaining the final feedwater temperature above a predetermined temperature value comprising:

first means for providing, upon activation, steam directly from said first extraction point to said one feedwater heater unit as supplemental heating steam to preheat the feedwater conducted therethrough;

second means for providing steam directly from said second extraction point to said one feedwater heater unit as heating steam to preheat the feedwater conducted therethrough;

means for monitoring steam system parameters representative of the power plant loading conditions; and controlling means, governed by said monitoring means, to activate said first means to provide supplemental heating steam to said one feedwater heater unit directly from said first extraction point solely at times when the monitored steam system parameters reflect power plant loading conditions which are below a first predetermined power plant loading condition.

2. A nuclear power plant steam system as recited in claim 1 including a third extraction point for extracting steam from the steam turbine, said extracted steam from said third extraction point being at a lower pressure than that of the second extraction point, and also varying as a function of the plant loading conditions; and another feedwater heater unit disposed in the feedwater return path for preheating the feedwater prior to entering the one feedwater heater unit; and wherein the temperature maintaining apparatus further includes:

third means for providing steam directly from said third extraction point to said another feedwater heater unit as heating steam to preheat the feedwater conducted therethrough;

fourth means for providing, upon activation, steam indirectly from the first extraction point to said another feedwater heater unit as supplemental heating steam to preheat the feedwater conducted therethrough; and second controlling means, governed by the monitoring means, to activate said fourth means to provide supplemental heating steam to said another feedwater heater unit indirectly from the first extraction point solely at times when the monitored steam system parameters reflect power plant loading conditions which are below a first predetermined power plant loading condition.

3. The apparatus in accordance with claim 2 wherein the monitored steam system parameters representative of the power plant loading conditions include the pressure of the steam of the second extraction point; and wherein the first and second controlling means activate the first and fourth means, respectively, at times, when said monitored second extraction point steam pressure falls below a first predetermined steam pressure value.

4. The apparatus in accordance with claim 1 wherein the controlling means includes a means for regulating thermodynamically the heating steam from the first extraction point to be compatible with that of the heating steam in the one feedwater heater unit.

5. The nuclear power plant steam system in accordance with claim 1 wherein the steam turbine includes a high pressure (HP) turbine section, at least one lower pressure (LP) turbine section and a reheater disposed therebetween for reheating the steam exhausted from said HP turbine section prior to entering said at least one LP turbine section, said reheater comprising first and second heating sections which utilize heating steam from the first and second extraction points, respectively; and wherein the heating steam exiting said first and second reheater sections are provided to the one feedwater heater unit for use as heating steam therein.

6. The nuclear power plant steam system in accordance with claim 5 including a third extraction point for extracting steam from the steam turbine, said extracted steam from said third extraction point being at a lower pressure than that of the second extraction point and varying as a function of the plant loading conditions; and another feedwater heater unit disposed in the feedwater return path for preheating the feedwater prior to entering the one feedwater heater unit; and wherein the temperature maintaining apparatus further includes:

third means for providing steam from said third extraction point to said another feedwater heater unit as heating steam to preheat the feedwater conducted therethrough;

means for redirecting, upon activation, the path of the heating steam exiting the second section of the reheater from being provided to the one feedwater heater unit to being provided to said another feedwater heater unit for use as heating steam therein;

means for increasing, upon activation, the steam pressure of the steam from the first extraction point prior to being provided to the one feedwater heater unit;

means for redirecting, upon activation, the path of the heating steam exiting the first section of the reheater from being provided to the one feedwater heater unit to being provided to the another feedwater heater unit for use as heating steam therein;

wherein the first means and said steam redirecting means associated with the first section of the reheater are activated by the controlling means solely at times when the monitored steam system parameters reflect power plant loading conditions which are below a first predetermined power plant loading condition; and wherein said steam pressure increasing means and said steam redirecting means associated with the second section of the reheater are activated by the controlling means solely at times when the monitored steam system parameters reflect power plant loading conditions which are below a second predetermined power plant loading condition which is lower in scale than said first predetermined power plant loading condition.

7. The nuclear power plant steam system in accordance with claim 6 wherein the first, second and third extraction points are located at the HP turbine section.

8. The nuclear power plant steam system in accordance with claim 6 wherein the monitored steam system parameters representative of the power plant loading conditions include the pressure of the steam of the second extraction point; and wherein the controlling means activates the first means and the steam redirecting means associated with the first reheater section solely at times when said monitored pressure of the steam from the second extraction point falls below a first predetermined value and activates the steam pressure increasing means and the steam redirecting means associated with the second reheater section solely at times when the monitored pressure of the steam from the second extraction point falls below a second predetermined value which is lower in pressure than said first predetermined value.

9. The nuclear power plant steam system in accordance with claim 6 including a source of steam at a pressure substantially greater than that of the steam from the first extraction point; and wherein the steam pressure increasing means comprises a jet pump utilizing motive steam provided thereto from said steam source.

10. In a nuclear power plant steam system including a steam generating means for generating steam; a steam turbine for conducting said generated steam therethrough and having at least first and second steam extraction points for extracting steam therefrom, the steam pressures of said first and second extraction points varying as a function of the plant loading conditions with the steam pressure of said first extraction point being greater than that of said second; a condenser for condensing exhausted steam from said steam turbine; a return path for returning said condensed steam as feedwater to said steam generating means; and at least one feedwater heater unit disposed in said return path for preheating the feedwater conducted therethrough to a final feedwater temperature prior to entering said steam generating means, a method for maintaining the final feedwater temperature above a predetermined temperature value comprising the steps of:

providing steam directly from said second extraction point to said one feedwater heater unit as heating steam to preheat the feedwater conducted therethrough;

monitoring steam system parameters representative of the power plant loading conditions; and providing steam directly from said first extraction point to said one feedwater heater unit as supplemental heating steam to preheat the feedwater conducted therethrough solely at times when said monitored steam system parameters reflect power plant loading conditions which are below a first predetermined power plant loading condition.

11. The method in accordance with claim 10 including the steps of:

providing heating steam directly from a third extraction point of said steam turbine to another feedwater heater unit disposed in the feedwater return path for preheating the feedwater conducted therethrough prior to entering the one feedwater heater unit; and providing steam indirectly from the first extraction point to said another feedwater heater unit as supplemental heating steam to preheat the feedwater conducted therethrough solely at times when the monitored steam system parameters reflect power plant loading conditions which are below said first predetermined power plant loading conditions.

12. The method in accordance with claim 10 including the steps of:

passing heating steam from the first extraction point through a first reheater section which reheats steam exhausted from a high pressure section of the steam turbine prior to entering at least one lower pressure section of the steam turbine;

providing the heating steam exiting said first reheater section to the one feedwater heater unit to preheat the feedwater conducted therethrough;

providing heating steam directly from a third extraction point of said steam turbine to another feedwater heater unit disposed in the feedwater return path for preheating the feedwater conducted therethrough prior to entering the one feedwater heater unit; and redirecting the heating steam exiting said first reheater unit from being provided to the one feedwater heater unit to being provided to said another feedwater heater unit to supplementally preheat the feedwater conducted therethrough solely at times when the monitored steam system parameters reflect power plant loading conditions which are below said first predetermined plant loading condition.

13. The method in accordance with claim 12 including the steps of:

passing heating steam from the second extraction point through a second reheater section which reheats steam exhausted from the high pressure turbine section prior to entering the at least one lower pressure turbine section;

providing heating steam exiting said second reheater section to the one feedwater heater unit to preheat the feedwater conducted therethrough;

increasing the pressure of the steam of the first extraction point prior to being directly provided to the one feedwater heater unit solely at times when the monitored steam system parameters reflect power plant loading conditions which are below a second predetermined plant loading condition which is lower in scale than the first predetermined plant loading condition; and redirecting the heating steam exiting said second reheater section from being provided to the one feedwater heater unit to being provided to the another feedwater heater unit solely at times when the monitored steam system parameters reflect power plant loading conditions which are below said second predetermined plant loading condition.

* * * * *